(12) United States Patent
Smith et al.

(10) Patent No.: US 8,156,876 B2
(45) Date of Patent: Apr. 17, 2012

(54) SYSTEMS AND METHODS FOR INTEGRATED PLASMA PROCESSING OF WASTE

(75) Inventors: Michael S. Smith, Buford, GA (US);
Kevin C. Caravati, Smyrna, GA (US);
Louis J. Circeo, Atlanta, GA (US);
Robert C. Martin, Jr., Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 309 days.

(21) Appl. No.: 11/473,425

(22) Filed: Jun. 23, 2006

(65) Prior Publication Data

US 2007/0012231 A1    Jan. 18, 2007

Related U.S. Application Data

(60) Provisional application No. 60/693,400, filed on Jun. 23, 2005.

(51) Int. Cl.
*F23N 1/00* (2006.01)
*F23G 5/027* (2006.01)
*F23G 5/10* (2006.01)

(52) U.S. Cl. ........ 110/186; 110/229; 110/250; 110/234; 110/346; 110/348

(58) Field of Classification Search ................ 110/229, 110/233, 250, 346, 347, 348, 234, 185, 203, 110/204, 186; 431/278
See application file for complete search history.

(56) References Cited

U.S. PATENT DOCUMENTS

| | | | |
|---|---|---|---|
| 3,779,182 A | 12/1973 | Camacho | |
| 4,602,573 A * | 7/1986 | Tanca | 110/342 |
| 5,143,000 A | 9/1992 | Camacho | |
| 5,280,757 A | 1/1994 | Carter et al. | |
| 5,626,088 A * | 5/1997 | Hiltunen et al. | 110/243 |
| 5,823,764 A * | 10/1998 | Alberti et al. | 110/265 |
| 5,852,927 A | 12/1998 | Cohn et al. | |
| 6,018,471 A * | 1/2000 | Titus et al. | 363/126 |
| 6,068,470 A * | 5/2000 | Zarzalis et al. | 431/187 |
| 6,127,645 A * | 10/2000 | Titus et al. | 110/250 |
| 6,686,556 B2 * | 2/2004 | Mitchell | 110/346 |

(Continued)

FOREIGN PATENT DOCUMENTS

JP    06-241063    8/1994

(Continued)

OTHER PUBLICATIONS

Korean Intellectual Property Office International Search Report and Written Opinion for PCT/US2006/024510 dated Nov. 8, 2006.

*Primary Examiner* — Kenneth Rinehart
*Assistant Examiner* — David J Laux
(74) *Attorney, Agent, or Firm* — Trenton A. Ward, Esq.; Troutman Sanders LLP

(57) ABSTRACT

Systems and methods of integrating plasma waste processing are described. An integreted energy generation system provided with a fossil fuel power plant system having a combustion chamber and a plasma waste processing system having an output. The integrated energy generation system also including an integrator for combining the output of thermal energy from the plasma waste processing system with the combustion chamber of the fossil fuel power plant.

14 Claims, 7 Drawing Sheets

U.S. PATENT DOCUMENTS

| | | | |
|---|---|---|---|
| 6,718,889 B1 * | 4/2004 | Brazier et al. | 110/234 |
| 6,779,333 B2 * | 8/2004 | Gerhold | 60/39.53 |
| 6,951,454 B2 * | 10/2005 | Sarv et al. | 110/262 |
| 6,987,792 B2 * | 1/2006 | Do et al. | 110/346 |
| 7,249,564 B2 * | 7/2007 | Lissianski et al. | 110/345 |
| 7,299,756 B2 * | 11/2007 | Gnedenko et al. | 110/250 |
| 7,363,866 B2 * | 4/2008 | Gnedenko et al. | 110/101 CD |
| 2004/0251241 A1 * | 12/2004 | Blutke et al. | 219/121.59 |

FOREIGN PATENT DOCUMENTS

| | | |
|---|---|---|
| JP | 2000-320817 | 11/2000 |
| KR | 10-0237258 | 1/2000 |

\* cited by examiner

SYSTEMS AND METHODS FOR INTEGRATED PLASMA PROCESSING OF WASTE

CROSS REFERENCE TO RELATED APPLICATIONS

This application claims priority of U.S. Provisional Patent Application No. 60/693,400, filed Jun. 23, 2005, the entire contents and substance of which are hereby incorporated by reference.

BACKGROUND

1. Field of the Invention

The present invention relates to energy generation and, more particularly, to energy generation through the plasma treatment of waste materials.

2. Description of Related Art

In 1800, the world population totaled less than 1 billion. In the mere two hundred years between 1800 and 2000, the world population exploded by six times to a total of 6.1 billion inhabitants. Predictions estimate that this number could rise to near 9 billion in the next fifty years. As the population grows exponentially, two corollaries grow along with it: (1) the demand for energy, and (2) the creation of waste. The processes used to create the energy necessary to meet the ever increasing energy demands of the world population and the overwhelming creation of large amounts of waste by the world population are perhaps the two most significant factors contributing to the destruction of the environment.

In the U.S., the fulfillment of the demand for energy is met almost entirely by fossil fuel power plants. Fossil fuel power plants are energy conversion centers that combust fossil fuels to produce electricity. A fossil fuel power plant converts the chemical energy stored in fossil fuels such as coal, fuel oil, or natural gas into thermal energy, then mechanical energy, and finally electrical energy for distribution and use. Significantly, almost 80% of electricity produced in the U.S. comes from power plants that burn coal. A heavy reliance upon fossil fuels for energy generation has many drawbacks. First, the combustion of fossil fuels can create harmful solid and gaseous emissions that must be filtered and controlled to prevent pollution. Second, the solid emissions, such as fly ash, that are filtered from the output of the fossil fuel combustion processes must be deposited into waste facilities, such as landfills. Third, supplies of fossil fuels, such as coal, are finite and will eventually be depleted. In light of the many drawbacks of fossil fuel based energy generation, much emphasis has been placed on finding alternative methods of energy generation.

A large amount of research and development has been conducted into alternative energy sources involving the harvesting of energy from naturally occurring sources. For example, much research has been conducted concerning harvesting geothermal energy, solar energy, and wind energy. As these energy sources are naturally occurring, the by-products associated with their conversion are more limited. These naturally occurring energy sources, however, are somewhat limited in their potential total capacity, especially in view of the rapidly increasing demand for energy.

An additional area of research and development with respect to alternative energy sources, has been focused on harvesting the energy of waste. Energy From Waste (EFW) technologies have been, and continue to be, developed that generate energy as a by-product to the destruction of waste. The most widely known type of EFW facility is incineration. While widely used, incineration facilities are costly, ineffective, and sources of pollution. Most incineration facilities require extensive air pollution control systems to reduce emissions from the waste combustion process below regulatory levels. Additionally, like fossil fuel power plants, incineration facilities generate a significant amount of solid emission by-product in the form of fly ash. This fly ash must be deposited and thus further contributes to landfill expansion.

A significant advancement in pursuit of EFW technologies has been achieved in the field of plasma processing. Plasma processing, or gasification, of waste materials involves the exposure of waste materials to extraordinarily high temperatures that disassociate the organic components into their elemental components and vitrify the inorganic components into a glassy rock-like residue. The energy release from this process can be used to sustain the plasma process and to create electrical energy for distribution. Thus, not only does plasma waste processing present a potential solution that could efficiently and safely dispose of waste materials, but it also represents a potentially viable alternative energy source.

Plasma waste processing facilities are complex systems that differ significantly from combustion type processing facilities. Plasma can generally be described as an electrically conducting gas. Lightning is the most common example in nature. At normal temperatures and pressures, gases are usually very good electrical insulators. This is because the electrons in the gas are tightly bound inside gas atoms and are not free to move in response to externally applied electric or magnetic fields. Under certain conditions, however, some or all of the electrons can be removed from their parent atoms, a process called ionization. The gas then has of a mixture of negatively charged electrons, positively charged atoms, called ions, and un-ionized neutrally charged atoms. Now the electrons and ions are free to move under the action of applied electromagnetic fields and the gas can conduct electricity. Due to their much smaller mass the electrons respond to the applied fields much more readily than the ions and, consequently, carry most of the current. Since electrons and ions are produced in pairs and have opposite charges most of the plasma remains electrically neutral.

Because the plasma is a gas and cannot melt, it can be used in a "plasma torch" as a resistive heating element capable of producing temperatures exceeding 7000 degrees Celsius, up to three times hotter than those produced by combustion and hotter than the surface of the sun.

As described in U.S. Pat. No. 5,280,757, U.S. Pat. No. 5,143,000, U.S. Pat. No. 3,779,182, and other prior art, plasma arc heated processes have received considerable attention for waste treatment over fuel combustion heated processes because of several distinct advantages of plasma heat which is well suited for the pyrolysis and vitrification of waste materials. A plasma arc torch operates by supporting a high voltage electric arc on a flow of plasma (ionized) gas to generate an extremely hot "flame." The quantity of plasma gas flowing through the plasma torch is significantly less than the quantity of gas required to release the equivalent heat energy by the combustion of hydrocarbon fuels. A further difference and advantage of a plasma torch heat source over a combustion heat source is that the plasma torch can be used to produce useful by-product gases of higher caloric content referred to as the degassing process. In addition, by virtue of the fact that a plasma arc torch uses only a small quantity of gas to support the arc and generate the heat, combustion is unlikely to occur spontaneously in the materials which are being heated. A major advantage of the plasma torch is that it is capable of unusually high rates of heat transfer, adding to its inherent efficiency. Also, the temperature of 4,000-7,000 degrees Celsius generated by a plasma torch is much hotter than that generated by a combustion source and is hot enough to melt known materials simultaneously with the pyrolysis degassing process.

Conventional systems have been relatively successful in demonstrating the theoretical possibility of recovering the energy of Municipal Solid Waste ("MSW") with plasma processing. For example, some prior art systems have shown that it may be possible to recover over 90% of the energy value of a waste stream.

Despite the overwhelmingly exciting theoretical benefits, the implementation of plasma waste processing facilities and systems in practical environments have been extremely limited due to implementation obstacles and to the deficiencies of the prior art systems. The difficultly in achieving efficient and cost effective implementations of plasma waste processing facilities is perhaps best illustrated by the fact that despite their tremendous possible benefits, there are only two known commercial plasma waste processing facilities in the world, all located in Japan. The implementation of plasma waste processing facilities has been significantly hindered by many factors. One primary hindrance is due to the relatively large capital cost associated with the initial provisioning of a plasma waste processing facility. The construction and provisioning of the multiple complex elements of a plasma waste processing facility, including the plasma reactor, gas treatment systems, and the electrical generator systems, require a significant amount of initial investment. Additionally, the efficiency of plasma waste processing facilities are closely tied to economies of scale. For example, a smaller facility with a relatively small daily volume of MSW will inherently be less efficient than a larger facility with a relatively large daily volume of MSW. Furthermore, some plasma reactor configurations are less well suited for energy recovery due to the relatively high plasma energy requirements (500 to 600 kWhr/ton of waste) of certain types of arc plasma torches.

Accordingly, there is a need in the art for a more efficient method by which to recover energy from waste.

Additionally, there is a need in the art for an efficient method to integrate a plasma waste processing system into an existing energy generation system.

Additionally, there is a need for the ability to use plasma waste processing systems with high efficiency generators.

Additionally, there is a need in the art for plasma waste processing system that can reliably covert a high percentage of energy of a waste stream.

Additionally, there is a need in the art for a plasma waste processing system that can generate energy in an efficient manner.

Additionally, there is a need in the art for a plasma waste processing system that can improve the efficiency, cost effectiveness, and environmental performance of existing energy generation systems.

BRIEF SUMMARY

The present invention provides systems and methods for integrated plasma waste processing. Various embodiments of the present invention overcome the deficiencies in the prior art, by providing an efficient and highly compatible integrated plasma waste processing system.

In an exemplary embodiment, integrated energy generation system has a fossil fuel power plant system with a combustion chamber and a plasma waste processing system with an output. The integrated energy generation system also includes an integrator for combining an output of thermal energy from the plasma waste processing system with a combustion chamber of the fossil fuel power plant.

These and other objects, features and advantages of the present invention will become more apparent upon reading the following specification in conjunction with the accompanying drawing figures.

DETAILED DESCRIPTION OF PREFERRED EMBODIMENTS

Figure 1:
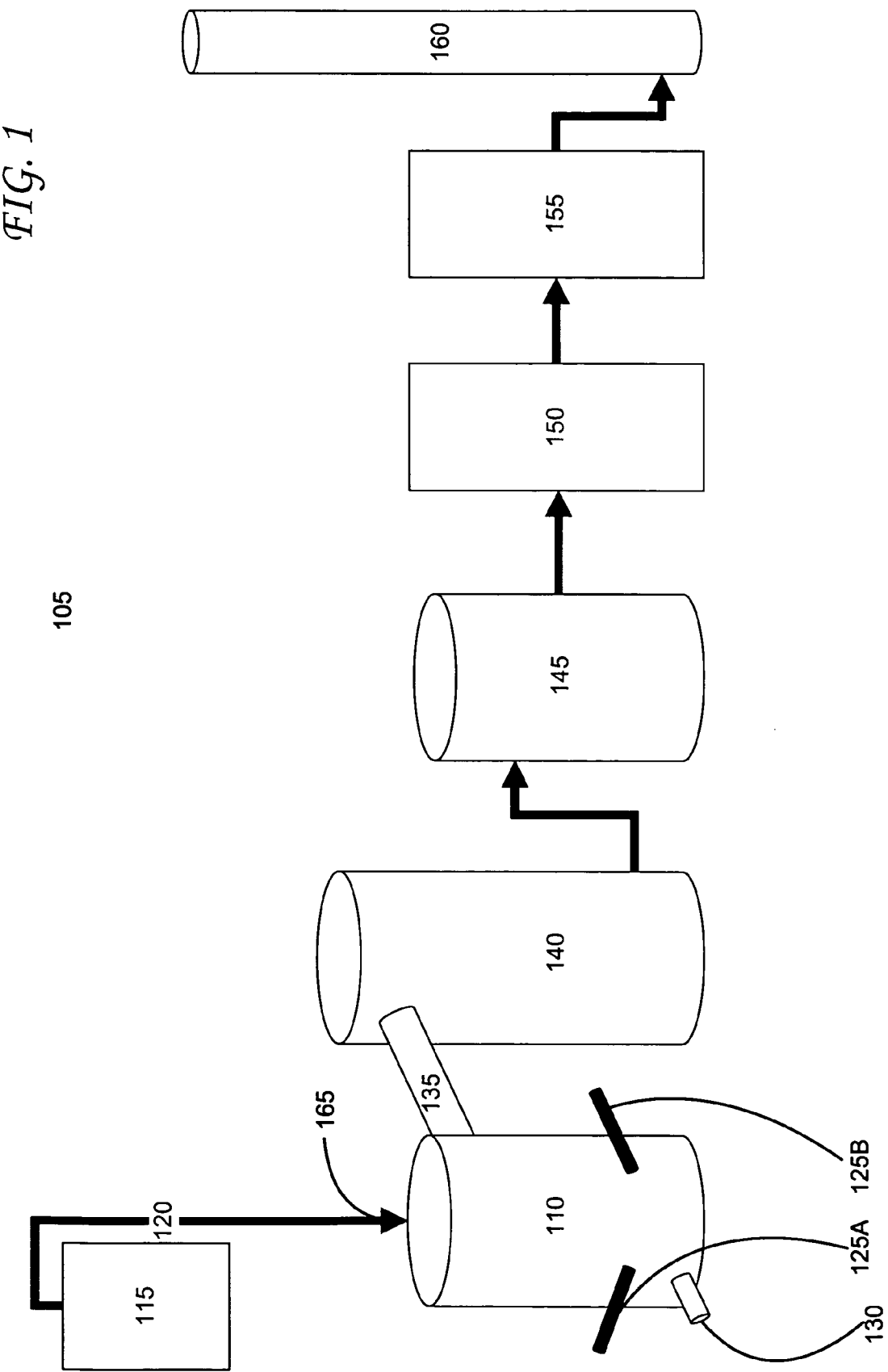
FIG. 1 is an illustration of a prior art plasma waste processing system.

To facilitate an understanding of the principles and features of the invention, it is explained hereinafter with reference to its implementation in illustrative embodiments. In particular, the present invention is directed toward systems and methods for integrated plasma waste processing.

Referring now to the figures, wherein like reference numerals represent like parts throughout the several views, exemplary embodiments of the present invention will be described in detail. Throughout this description, various components may be identified having specific values, these values are provided as exemplary embodiments and should not be limiting of various concepts of the present invention as many comparable sizes and/or values may be implemented.

FIG. 1 is an illustration of a prior art plasma waste processing system. The various stages of a plasma waste processing system 105 are shown throughout FIG. 1. The plasma waste processing system 105 has a plasma reactor 110 in which materials are gasified. Heterogeneous refuse, or MSW, containing both organic and inorganic materials can be inputted into the plasma reactor 110. The terms MSW and waste are used synonymously herein to refer to all types of materials. For example, the terms MSW and waste are used herein to refer to residential, commercial, hazardous, toxic and other types of refuse, solid wastes, liquid wastes, gaseous wastes, scrap tires, automobile waste, medical wastes, oil sludges, and any other materials. Additionally the terms MSW and waste are used herein to refer to any type of carbonaceous material, such as low quality coal. A MSW hopper 115 is used to collect the MSW before processing, while maintaining the smoke and noxious gases within the MSW hopper 115 and preventing the escape of such gases from the plasma reactor 110. A conveying apparatus 120 provides a continuous stream of MSW from the MSW hopper 115 to the plasma reactor 110.

The plasma reactor 110 is provided with one or more long arc column plasma generators, also know as a plasma torches.

The plasma torches, 125A and 125B, shown in FIG. 1 are located in the lower portion of the plasma reactor 110 and extend angularly into the plasma reactor 110. The plasma torches, 125A and 125B, have cylindrically shaped electrodes and a gas directing nozzle. The plasma torches, 125A and 125B, are used to inject thermal energy into the plasma reactor 110 to induce pyrolytic conversion of the organic components of the MSW and the vitrification of the inorganic components of the MSW. The result of exposure to the heat of the plasma torches, 125A and 125B, is a combination of hot gases and molten slag. The molten slag is permitted to exit the plasma reactor 110 by flowing over a lip 130 in the bottom of the plasma reactor 110.

This molten slag contains the inorganic components derived from the plasma process. These residual materials, such as radionuclides and heavy metals, can be immobilized in a rock-like vitrified mass. This rock-like vitrified mass is highly resistant to leaching and is a saleable product useful in many applications. The way in which the molten slag output is treated, determines the type of substance created. The molten slag can be air cooled to obtain coarse aggregate capable of being used in gravel, asphalt, and other road surfaces. Alternatively, the molten slag can be water cooled to obtain a sand-like fine aggregate capable of use in concrete and concrete products. In other embodiments, the molten slag can be water cooled such that it forms small metal particles. Furthermore, the molten slag can be air blown into a "rock wool" structure capable of use in insulation and sound proofing.

The second output of the plasma waste processing system is hot gaseous emissions. The hot gaseous emissions are permitted to exit the plasma reactor 110 through an outlet 135 in the plasma reactor 110. This outlet 135 allows for the hot gaseous emissions to exit plasma reactor 110 and pass into an afterburner 140. The hot gaseous emissions of the plasma reactor 110 are primarily made up of two thermal components, sensible heat and fuel gases. The fuel gases exiting the plasma reactor are the product of the plasma process. When MSW is exposed to the extremely high temperature of the plasma torches, 125A and 125B, the wastes completely disassociate into their elemental components. The organic compounds in the wastes are pyrolyzed or volatilized and then recombine as fuel gases, such as hydrogen and carbon monoxide. The fuel gases can be harvested in some systems or combusted in other systems for energy generation.

In the plasma waste processing system 105 shown in FIG. 1, the afterburner 140 can be used to combust the fuel gases created by the plasma reactor 110. Therefore, the sensible heat and the fuel gases can flow from the plasma reactor 110 into the afterburner 140. The afterburner 140 can then combust the fuel gases and create thermal energy in addition to the thermal energy from the sensible heat.

In the embodiment depicted in FIG. 1, the hot gaseous emissions of the afterburner 140 can be passed to a boiler 145. The hot gaseous emissions of the afterburner 140 contain the thermal energy contained in the sensible heat provided from the plasma reactor 110 and the heat generated by the combustion of the by-product fuel gases combusted in the afterburner 140. The boiler 145 can be operated in accordance with well known thermal energy conversion applications. More particularly, the steam created by the boiler 145 can be used to turn a steam turbine and create mechanical energy, which can then be converted into electrical energy by a generator. In accordance with the conventional energy generation systems, the output of the boiler can then be sent to a cooling tower 150 and further processed by a filtration system 155, before ultimately being passed into the atmosphere via a stack 160.

The embodiment of the plasma waste processing system of the prior art illustrated in FIG. 1 is a system that implements a Plasma Direct Melting Reactor (PDMR). This reactor design permits a reduction in the plasma torch power required for waste processing as well as a continuous discharge of molten residue. For example, the plasma torch power can be reduced to a Specific Energy Requirement ("SER") value typically in the range of 200 to 300 kW and hour per ton of MSW. This is accomplished by adding metallurgical coke and limestone to the feed stream as it is introduced into the top of the reactor vessel. The metallurgical coke and limestone can be inputted into the plasma reactor 110 via the inlet 165. In a typical application the metallurgical coke should equal somewhere in the range of 4 to 7% of the total weight of the MSW inputted into the plasma reactor 110. The limestone should equal somewhere in the range of 0.2 to 1.5% of the total weight of the MSW inputted into the plasma reactor 110. As the MSW feed stream moves downward through the reactor, the coke helps to maintain the bed porosity and ensure uniform distribution of the hot gases which produce the pyrolysis reaction. The limestone acts as a flux to improve the fluidity of the vitrified reside and permit its continuous discharge from outlet 130 in the bottom of the reactor.

Figure 2:
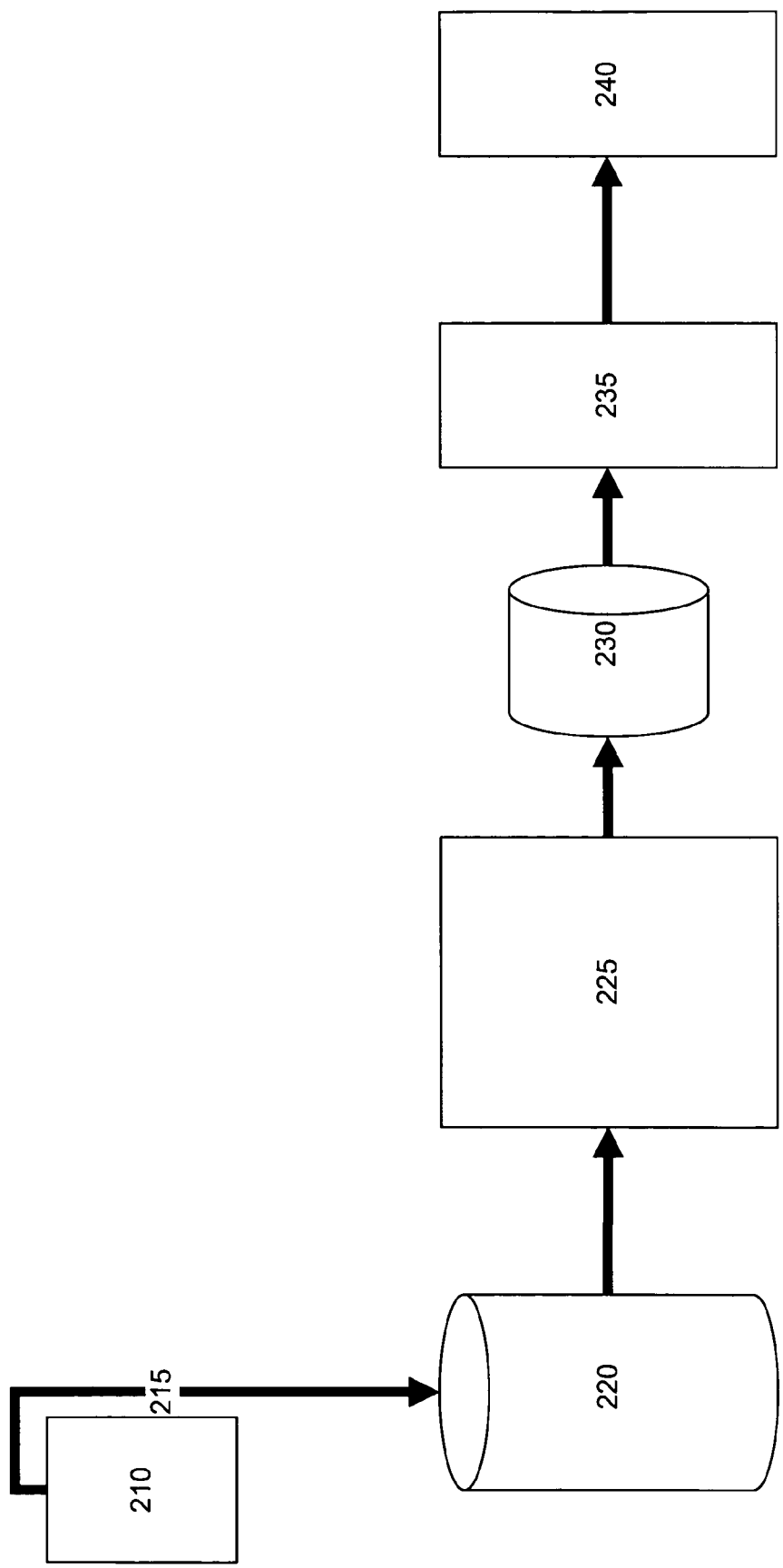
FIG. 2 is an illustration of a prior art fossil fuel power plant system.

FIG. 2 is an illustration of a prior art fossil fuel power plant system. The fossil fuel power plant system 205 depicted in FIG. 2 illustrates a coal fired power plant system. Coal is transported to the fossil fuel power plant system 205 and stored in a coal supply hopper 210. Some coal supply hoppers can provide for the crushing of the coal into relatively smaller pieces. A conveyor apparatus 215 transports the coal from the coal supply hopper 210 to a pulverizer/mill 220 to be ground into fine particles, which combust more cleanly and efficiently. The pulverized coal can then be taken from the pulverizer/mill 220 to the combustion chamber 225 of the fossil fuel power plant system 205. The pulverized coal is typically blown into the combustion chamber 225 via fuel nozzles at the corners of the combustion chamber 225.

In the combustion chamber 225, the pulverized coal rapidly combusts and forms a fireball at the center of the combustion chamber 225. Tubes are provided in the combustion chamber 225 that are filled with water. The water in the tubes absorbs the intense heat of the combustion chamber 225 and converts into steam. This steam can then be passed to a turbine 230.

The turbine 230 has of a series of steam turbines interconnected to each other and a generator 235 on a common shaft. There can be a high pressure turbine at one end, followed by an intermediate pressure turbine, a low pressure turbines, and the generator 235. As steam moves through the system and drops in pressure, it expands in volume, requiring larger diameter and longer blades in each succeeding turbine to extract the remaining energy. The generator 235 contains a stationary stator and a spinning rotor, each containing miles of heavy copper conductor. In operation the generator 235 is capable of spinning a relatively high number of revolutions per minute and producing a large amount of voltage, synchronized to the 60 Hz power grid. This electricity created by the generator 235 can flow to a substation/transformer 240, where transformers can step the voltage up as needed for transmission.

While plasma waste processing systems are generally known by those of ordinary skill in the art, the conventional plasma waste processing systems are costly, inefficient, and cumbersome to implement. For example, and not limitation, capital costs for construction of conventional plasma waste processing systems are exceedingly large. This is supported by the fact that there are a very small number of commercial plasma waste processing systems in operation in the world. Thus, there is a great desire for plasma waste processing methods and systems which are efficient, cost effective, and relatively easy to implement.

Figure 3:
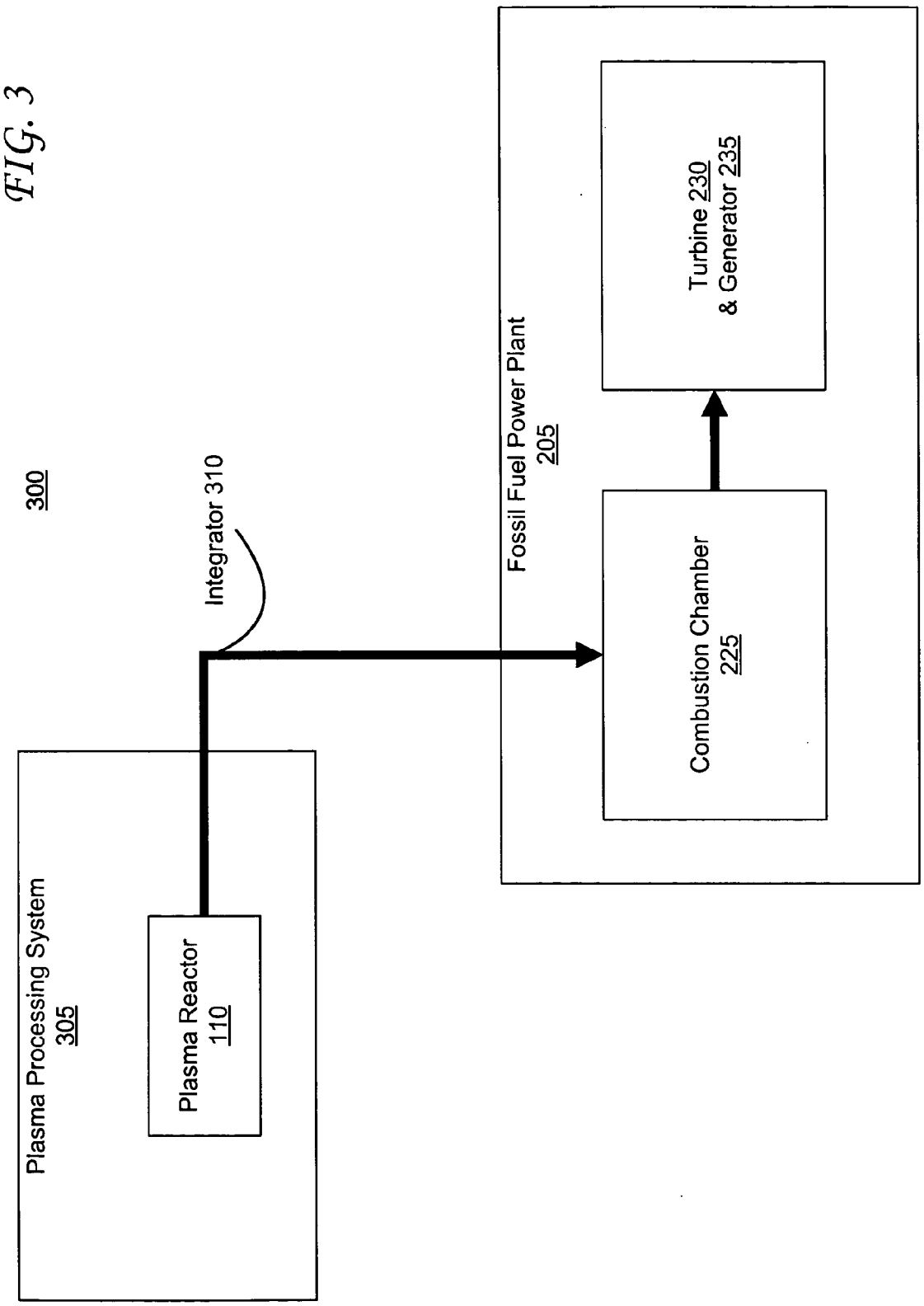
FIG. 3 is an illustration of an integrated energy generation system in accordance with an exemplary embodiment of the present invention.

FIG. 3 is an illustration of an integrated energy generation system in accordance with an exemplary embodiment of the present invention. As shown in FIG. 3, the integrated energy generation system 300 of the present invention incorporates both a plasma waste processing system 305 and a fossil fuel power plant 205. In the exemplary embodiment depicted in FIG. 3, the gaseous emissions of the plasma waste processing system 305 are passed into the combustion chamber 225 of the fossil fuel power plant system 205 via the integrator 310. Thereby, the integrated energy generation system 300 can enable the supplementation of the process of thermal energy creation in the fossil fuel power plant system 205 with emissions from the plasma waste processing system 305.

The fossil fuel power plant system 205 of the integrated energy generation system 300 can be similar to the coal fired power plant system described in relation to FIG. 2 or many other conventional fossil fuel power plant systems, such a fuel oil or natural gas systems. The plasma waste processing system 305 of the integrated system 300, however, is not similar to the conventional plasma waste processing systems. As illustrated in FIG. 3, the plasma waste processing system 305 of the integrated energy generation system 300 does not have the entire suite of components of the conventional plasma waste processing systems.

In the exemplary embodiment illustrated in FIG. 3, the plasma waste processing system 305 is essentially made up of the plasma reactor 110. The hot gaseous emissions created by the plasma reactor 110 are permitted to flow through the integrator 310 into the combustion chamber 225 of the fossil fuel power plant system 205. These hot gaseous emissions can contain both the sensible heat created by the plasma reactor 110 and the fuel gases created by the plasma reactor 110. The sensible heat can contribute directly to the thermal energy level of the combustion chamber 225, while the fuel gases can be combusted in the combustion chamber 225 to create additional thermal energy.

The elimination of many elements of the plasma waste processing system 305 enables a plasma waste processing system that is significantly more efficient and requires significantly less capital cost. For example, and not limitation, the initial capital costs for a plasma waste processing system 305 implemented in an integrated energy generation system 300 in accordance with the present invention could be reduced by 50%. Not only does the integrated energy generation system 300 of the present invention reduce the initial capital costs, it also reduces the costs associated with the continued operation and maintenance of a plasma waste processing system.

Figure 4:
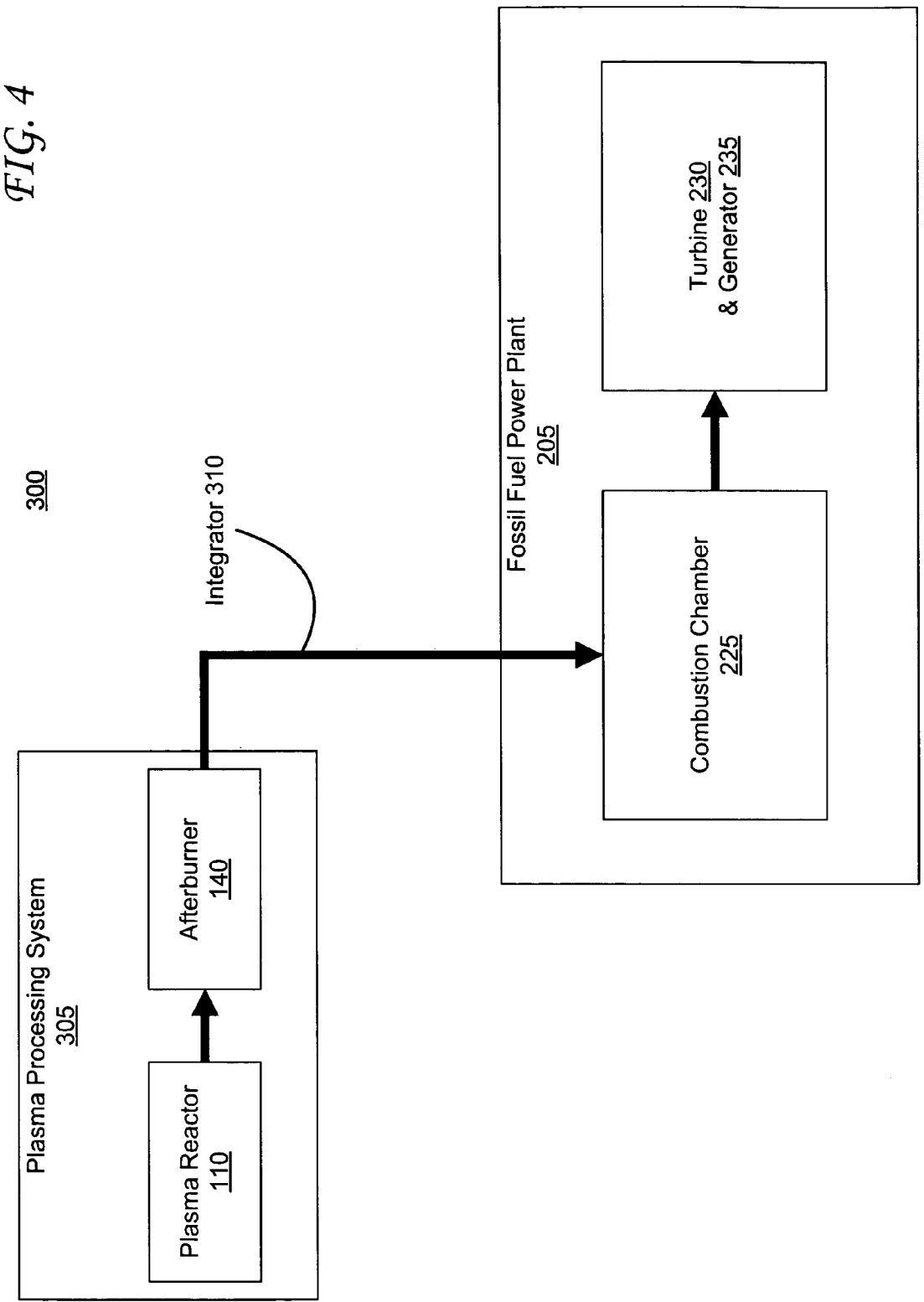
FIG. 4 is an illustration of an integrated energy generation system in accordance with an exemplary embodiment of the present invention.

FIG. 4 is an illustration of an integrated energy generation system in accordance with an exemplary embodiment of the present invention. As shown in FIG. 4, the integrated energy generation system 300 of the present invention incorporates both a plasma waste processing system 305 and a fossil fuel power plant 205. In the exemplary embodiment depicted in FIG. 4, the gaseous emissions of the plasma waste processing system 305 are passed into the combustion chamber 225 of the fossil fuel power plant system 205 via the integrator 310. The plasma waste processing system 305 in the exemplary embodiment depicted in FIG. 4 has a plasma reactor 110 and an afterburner 140, but does not have a boiler, a turbine, a generator, a cooling tower, a filtration system, or an emission stack. The afterburner 140 performs the operation of collecting both the sensible heat from the plasma reactor 110 and the fuel gases produced in the plasma rector 110. The afterburner 110 can combust the fuel gases received from the plasma reactor 110 to create additional thermal energy. Therefore, the output from the afterburner is a stream of gaseous emissions containing the thermal energy from both the sensible heat of the plasma reactor 110 and the thermal energy generated from the combustion of the fuel gases.

The integrated energy generation system 300 provides a plasma waste processing system 305 that is in communication with the fossil fuel power plant system 205. The communicative link between the two systems is provided by the integrator 310. The integrator 310 enables the transfer of hot gaseous emissions from the afterburner 140 of the plasma waste processing system 305 into the combustion chamber 225 of the fossil fuel power plant system 205.

The integrator 310 can be many devices which are capable of passing such hot gaseous emissions. In an exemplary embodiment the integrator 310 is a conduit connected to an outlet of the afterburner 140 and an inlet of the combustion chamber 225. In some embodiments, this conduit can be formulated from many different suitable materials, including steel, metal alloys, and other materials. The outlet of the afterburner 140 provides hot gaseous emissions which can travel through the integrator 310 and into the combustion chamber 225 of the fossil fuel power plant system 205.

The integrated energy generation system 300 can rely upon the facilities of the fossil fuel power plant system 205 for the components not contained in the plasma waste processing system 305. The reduced nature of the plasma waste processing system 305 in accordance with an exemplary embodiment of the present invention presents many advantages over the systems of the prior art.

The integrator 310 can be many different types of devices and can also be many different lengths. The variation in length of the integrator 310 can permit distance between the plasma waste processing system 305 and the fossil fuel power plant system 205. Therefore, the plasma waste processing system 305 and the fossil fuel power plant system 205 are not required to be co-located in the same facility or proximate area. In a non-limiting example, the integrator 310 is a pipe that extends a relatively large distance between the plasma waste processing system 305 and the fossil fuel power plant system 205. In some embodiments, the plasma waste processing system 305 and the fossil fuel power plant system 205 can be a couple hundred meters apart. In one embodiment, the integrator 310 can be a pipe that extends for over a one kilometer between the plasma waste processing system 305 and the fossil fuel power plant system 205. Certain limitations work against implementing an integrator 310 for exceedingly long distances. For example, the thermal energy passed from the plasma waste processing system 305 to the fossil fuel power plant system 205 by the integrator 310 will inherently dissipate a certain percentage when passing through the integrator 310. Therefore, in some embodiments, the length of the integrator 310 will be limited by the distance at which the dissipation in thermal energy becomes more than nominal. Those of skill in the art will appreciate that it is not only the length of the integrator 310 that effects the dissipation of the thermal energy being passed, but also the structural characteristics of the integrator and its environment. For example, and not limitation, a well insulated integrator 310 placed underground may dissipate thermal energy at a much lower rate that an uninsulated above ground integrator 310.

The hot gaseous emissions inserted into the combustion chamber 225 from the integrator 310 can be used to supplement the thermal energy creation process underway in the combustion chamber 225. Thereby, the net thermal energy inside the combustion chamber 225 can be increased by the amount of thermal energy provided from the plasma waste processing system 305. As a result, the fossil fuel power plant system 205 can use a lesser amount of fossil fuel resources to generate an equivalent amount of energy. For example, and not limitation, a coal fired power plant could reduce its coal usage in the amount of the thermal energy supplemented by the plasma waste processing system 305.

The integrated energy generation system 300 of the present invention presents many distinct advantages over the systems of the prior art. A distinct advantage of the integrated energy generation system 300 involves the ability of the plasma waste processing system 305 to rely upon the facilities of the fossil fuel power plant system 205 to generate electricity. One significant disadvantage to prior art plasma waste processing systems relates to the fact that their energy generation is inefficient. This is due in large part to the relative inefficiencies of the generators used by the plasma waste processing systems of the prior art. Those of skill in the art appreciate that the smaller the generator, the less efficient the generator. The size of the generator utilized by a plasma waste processing system is limited by the potential energy generation of the plasma waste processing system. More specifically, the energy generation potential of a plasma waste processing system is limited to the amount of MSW input available to that system. In a majority of implementations, the feasible input of MSW, measured in tons per day, is limited by transportation and availability concerns. Therefore, the conventional stand alone plasma waste processing systems have to use smaller scale generators which are significantly less efficient than larger scale generators. Smaller scale generators typically have an energy generation efficiency in the range of 15 to 20%. Larger scale generators, however, have an energy generation efficiency in the range of 30 to 35%. Thus, stand alone plasma waste processing systems loose a large portion of their energy generation potential to the inefficiency of smaller scale generators.

In an exemplary embodiment, the integrated energy generation system 300 overcomes the disadvantages of the prior art by enabling the plasma waste processing system 305 to rely upon the larger scale generators used in a fossil fuel power plant system 205. For example, and not limitation, the thermal energy generated by the plasma reactor 110 and transported to the combustion chamber 225 of the fossil fuel power plant system 205 can then be converted into electrical energy by the relatively efficient turbine 230 and generator 235 of the fossil fuel power plant system 205.

A further advantage of the integrated energy generation system 300 is its ability to allow for fluctuation in the supply of MSW available for a plasma waste processing system. In many plasma waste processing system implementations, a regulated flow of MSW is difficult to maintain and keep consistent. Furthermore, plasma waste processing systems are typically more efficient when acting on larger and more continuous quantities of MSW. For an integrated energy generation system 300 implemented in an embodiment of the present invention, it is possible to cycle the operation of the plasma waste processing system 305. For example, and not limitation, the plasma waste processing system 305 could be put into operation when a sufficient supply of MSW is available and be taken out of operation when the supply of MSW is below the necessary level. The fluctuation in operation of the plasma waste processing system 305 can be done without a significant loss in the total output of the integrated energy generation system 300. This can be accomplished by simply regulating the fossil fuel input to the combustion chamber 225 in accordance with the level of supplemental thermal energy being supplied through the integrator 310 by the plasma waste processing system 305. In an exemplary embodiment, when the plasma waste processing system 305 is operating, less coal is required for a coal fired fossil fuel power plant system 205, and when the plasma waste processing system 305 is not operating, more coal is required.

Figure 5:
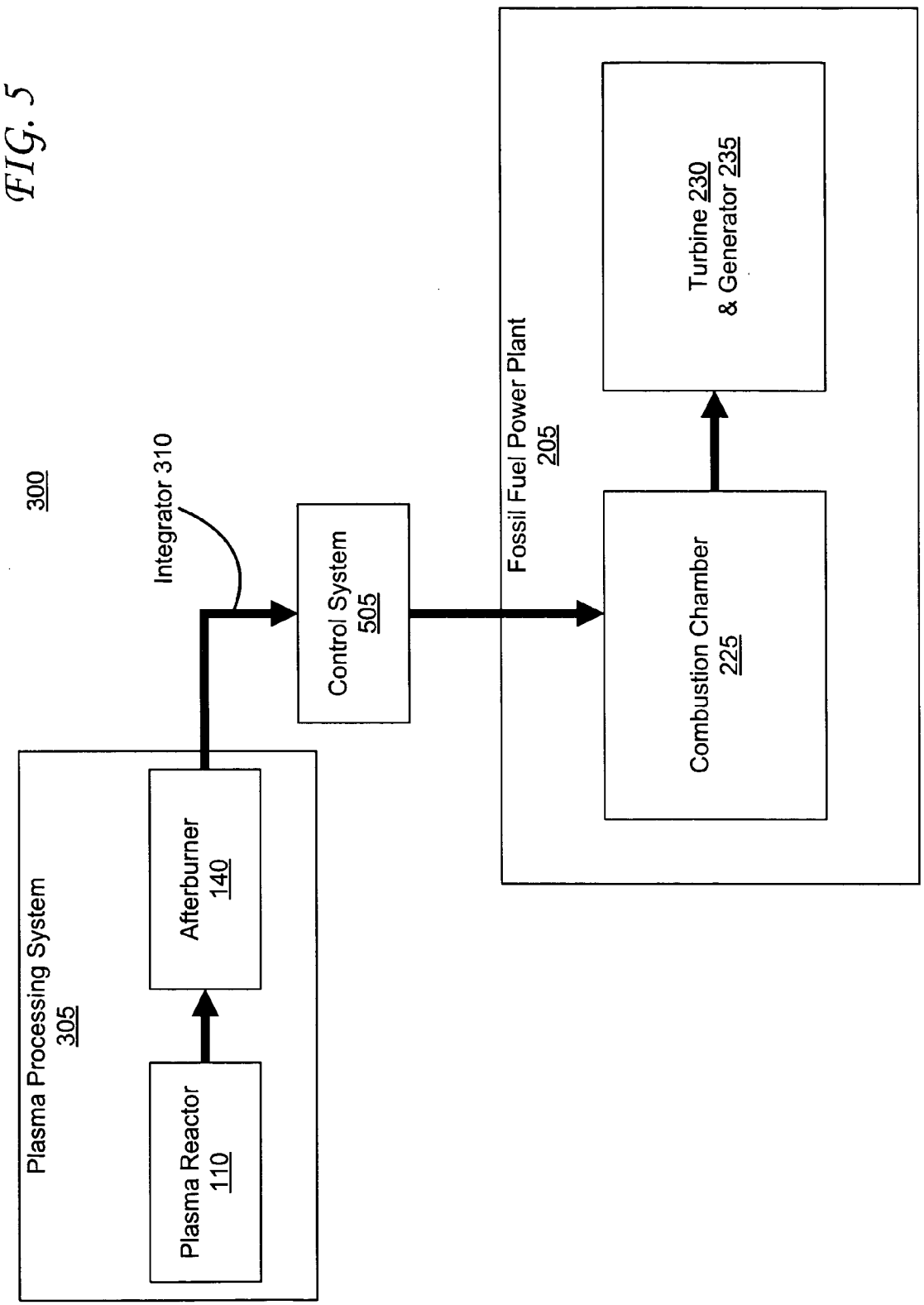
FIG. 5 is an illustration of an integrated energy generation system in accordance with an exemplary embodiment of the present invention.

FIG. 5 is an illustration of an integrated energy generation system in accordance with an exemplary embodiment of the present invention. The exemplary embodiment of the integrated energy generation system 300 depicted in FIG. 5 includes a control system 505. This control system 505 enables the operator of integrated energy generation system 300 to exercise control on the amount of thermal energy passed through the integrator 310.

In an exemplary embodiment, the control system 505 provides a module capable of monitoring the temperature of the gaseous emissions transmitted through the integrator 310. In a non-limiting example, the fossil fuel power plant system 205 can be a coal fired plant in which it is not desirable to raise the temperature inside the combustion chamber 225 above 1,000 degrees Celsius. This is due to the fact that temperatures in excess of 1,000 degrees Celsius can possibly damage some types of combustion chambers. In some embodiments of the combustion chamber 225, it is desired to combust coal at temperatures in the range of 800 degrees Celsius to 1,000 degrees Celsius.

The control system 505 enables the operator to control the temperature of the hot gases passed into the combustion chamber 225 from the integrator 310. In an exemplary embodiment, the operator can utilize the control system 505 to ensure that integrator 310 does not permit the induction of gases over a desired temperature. In an exemplary embodiment, the control system 505 is provided with a module capable of monitoring the temperature of the gas flowing through the integrator 310. When the module of the control system 505 determines that the temperature has exceeded a particular value, the module may cause for the integrator 310 to be closed or partially closed to inhibit the flow of gas through the integrator 310. For example, and not limitation, the control system 505 can limit the output of the integrator 310 to supply only gases below 1,000 degrees Celsius. In another embodiment, the control system 505 is provided with a cooling apparatus which are capable of cooling the gaseous emissions flowing through the integrator 310 to a desired temperature.

Figure 6:
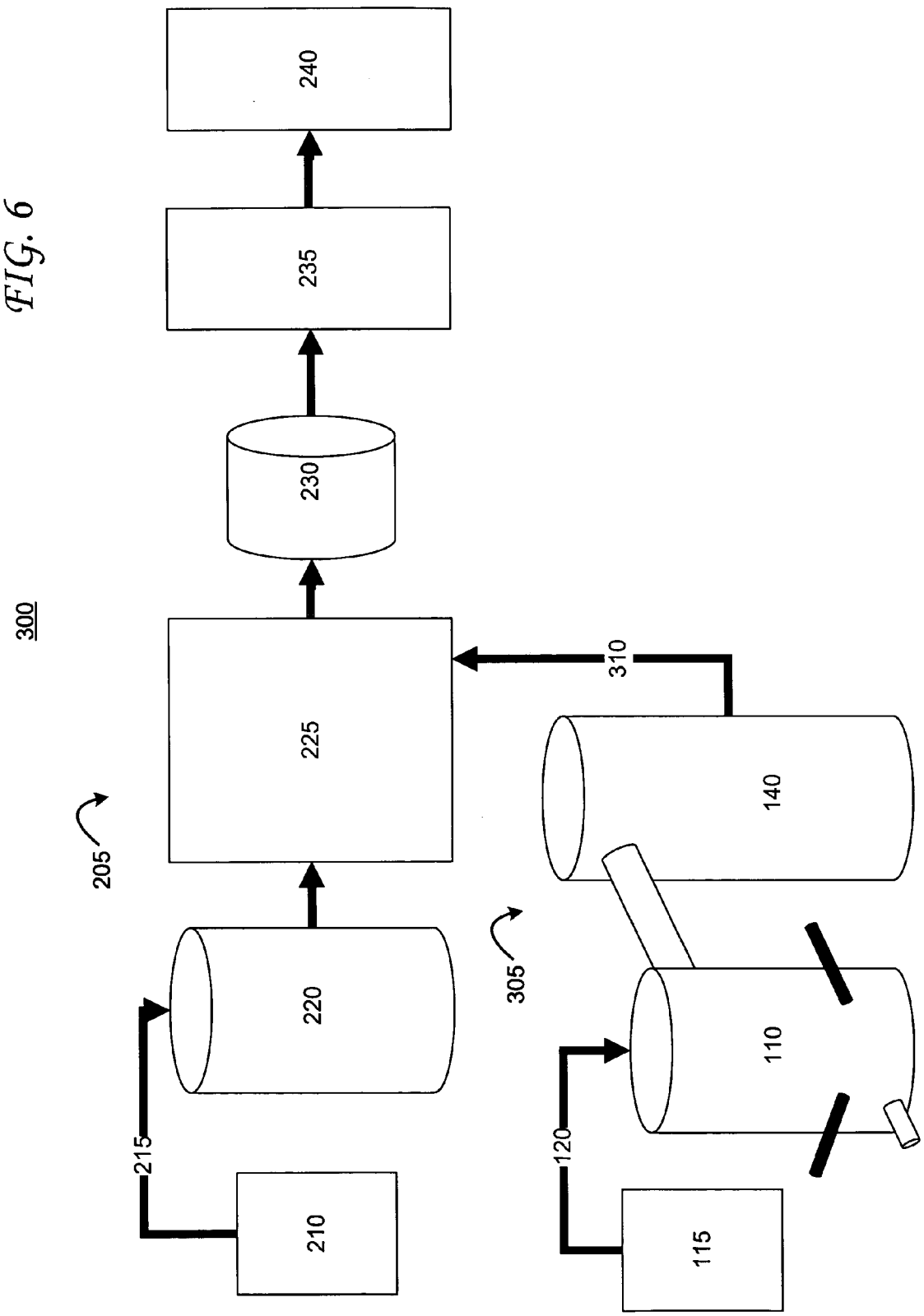
FIG. 6 is an illustration of an integrated energy generation system in accordance with an exemplary embodiment of the present invention.

FIG. 6 is an illustration of an integrated energy generation system in accordance with an exemplary embodiment of the present invention. An exemplary embodiment of the integrated energy generation system 300 in accordance with the present invention is shown in FIG. 6 as implemented with a coal fired fossil fuel power plant system 205. As illustrated, the plasma waste processing system 305 contains the plasma reactor 110 and the afterburner 140. The plasma waste processing system 305 does not contain a boiler 145, cooling tower 150, filtration system 155, or emission stack 160.

The plasma waste processing system 305 is connected to the fossil fuel power plant system 205 by the integrator 310. As shown in FIG. 6, the integrator 310 enables the passage of the emissions from the afterburner 140 of the plasma waste processing system 305 to the combustion chamber 225 of the fossil fuel power plant system 205. Thereby, the plasma waste processing system 305 can supplement the thermal energy generated in the combustion chamber 225 and decrease the amount of fossil fuel required by the fossil fuel power plant system 205. In a non-limiting example, the plasma waste processing system 305 can reduce the coal input requirements for the fossil fuel power plant system 205 by an amount of coal with a thermal energy value equivalent to the thermal energy supplied by the plasma waste processing system 305.

Figure 7:
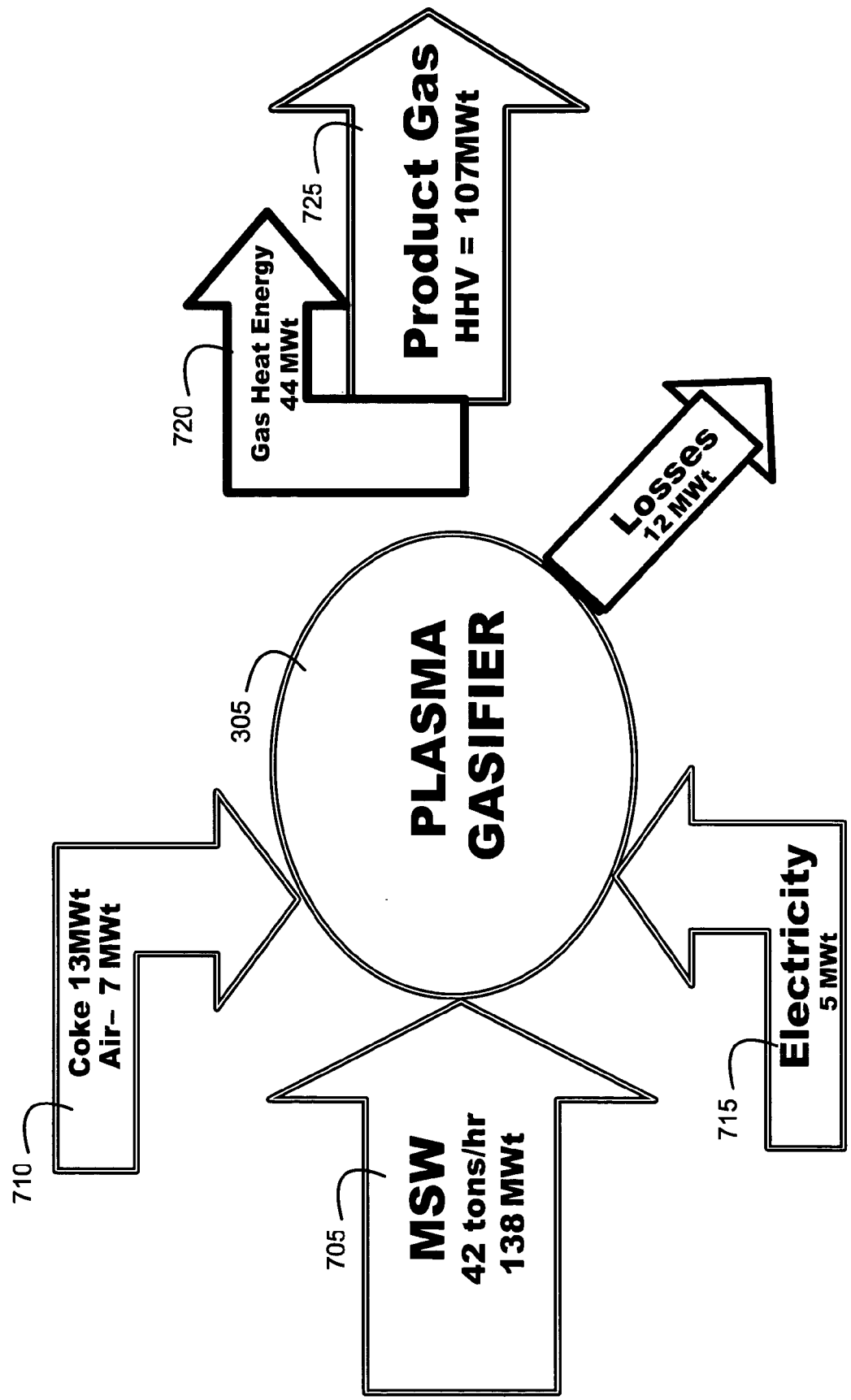
FIG. 7 is flow chart of input and output energy specifications of the integrated energy generation system in accordance with an exemplary embodiment of the present invention.

FIG. 7 is flow chart of input and output energy specifications of the integrated energy generation system in accordance with an exemplary embodiment of the present invention. The center circle of the flow chart in FIG. 7 represents the plasma waste processing system 305 in an exemplary embodiment. The data provided in FIG. 7 is representative of a notional 24 hour period of operation for a 1000 ton per day plasma waste processing system 305 in accordance with an embodiment of the present invention. Those of skill in the art will appreciate that the figures and numerical values provided in FIG. 7 are provided purely for illustration of an exemplary embodiment of the present invention, and could significantly vary in alternative embodiments based on variables such as facility size, input requirements, and output requirements. The primary input 705 to the plasma waste processing system 305 can be MSW at 42 tons an hour, totaling around 1000 tons for a 24 hour period. The representative heat energy value of the primary input 705, 42 tons of MSW an hour, is on the order of 138 Mega Watt thermal (MWt). Furthermore, quantities of metallurgical coke can be added to the input stream to stabilize the process and make it more efficient. As shown, this second input 710, can provide a thermal energy value of 13 MWt for the metallurgical coke. Additionally, air may be inserted into the system to facilitate plasma gasification and require an energy value input of around 7 MWt. The energy needed to operate the plasma torches of the plasma waste processing system 305 is provided by an electrical source. As shown, the needed energy for the electrical source for operation, the third input 715, is on the order of 5 MWt.

The result of the plasma gasification process is a quantity of sensible heat and product gas. The sensible heat is that created by the plasma reactor, and the product gas is the by-product fuel gases created by plasma gasification. The sensible heat, or gas heat energy 720, generated from operation of the plasma waste processing system 305 totals around 44 MWt. Furthermore, the energy generated from the fuel gases, or product gas 725, from operation of the plasma waste processing system 305 totals around 107 MWt.

From the total energy generated, 151 MWt, electricity can be created. In accordance with the present invention, the integrated energy generation system using the efficient large scale generators of the fossil fuel power plant system 205 can convert between 30 to 35% of this total energy into electricity passed to a grid for distribution. Thus, for the embodiment shown in the FIG. 7, a total of 47 Mega Watt electrical (MWe) of electricity can be created from the total of 151 MWt generated.

This represents the significant advantages of the integrated energy generation system of the present invention over the prior art. In an non-limiting example, if the same amount of energy, 151 MWt, was created by a stand alone plasma waste processing system, the stand alone system would only be able to convert around 18% of this energy into electricity with a small scale generator. Thus, a stand-alone plasma waste processing system would generate a total of about 30 MWe of electricity given the inputs of FIG. 7, while the integrated energy generation system in accordance with an exemplary embodiment of the present invention would generate about 47 MWe.

While the invention has been disclosed in its preferred forms, it will be apparent to those skilled in the art that many modifications, additions, and deletions can be made therein without departing from the spirit and scope of the invention and its equivalents, as set forth in the following claims.

What is claimed is:

1. A method of reducing the amount of coal required by a coal fired power plant, comprising the steps of:
    combusting a plurality of coal in a combustion chamber of the existing coal fired power plant;
    processing waste in a plasma reactor;
    transmitting a plurality of gaseous emissions comprising at least a first component of sensible heat from an afterburner of the plasma reactor to the combustion chamber of the existing coal fired power plant and supplementing the thermal energy of the combustion chamber with the thermal energy contained in the plurality of gaseous emissions; and
    controlling the amount of gaseous emissions output from the afterburner and input into the combustion chamber with a control system, wherein the control system provides a control module having logic enabled to monitor the induction of gaseous emissions output from the afterburner including at least the temperature of the gaseous emissions and control at least a volume of the gaseous emissions output from the afterburner and input into the combustion chamber.

2. The method of reducing the amount of coal required by a coal fired power plant of claim 1, wherein the amount of the plurality of coal combusted is reduced by an amount equivalent to the value of the thermal energy supplied by the plurality of gaseous emissions from the plasma reactor.

3. A plasma waste processing system comprising:
    a plasma reactor;
    an afterburner in communication with the plasma reactor, the afterburner enabled to combust the by-product fuel gases from the plasma reactor; and
    a combustion chamber of an existing coal fired power plant or an existing oil fired power plant in communication with the afterburner to receive a plurality of gaseous emissions comprising at least a first component of sensible heat from the afterburner, wherein at least the first component of sensible heat reduces the amount of coal required by the existing coal fired power plant or the amount of oil required by the existing oil fired power plant; and
    a control system enabled to control the amount of thermal energy output from the afterburner and input into the combustion chamber, wherein the control system provides a control module having logic enabled to monitor the induction of a plurality of gases from the output of the afterburner including at least the temperature of the gases and control at least a volume of the gases output from the afterburner and input into the combustion chamber.

4. The plasma waste processing system of claim 3, wherein the plurality of gaseous emissions of the afterburner are communicated to the combustion chamber of the coal fired power plant or the oil fired power plant via an integrator.

5. The plasma waste processing system of claim 3, wherein the plurality of gaseous emissions from the afterburner contribute a quantity of the thermal energy to the combustion chamber of the coal fired power plant or the oil fired power plant.

6. The plasma waste processing system of claim 5, wherein a quantity of the coal or the oil combusted by the coal fired power plant or the oil fired power plant is reduced by an amount proportionate to the quantity of thermal energy contributed by the plurality of gaseous emissions from the afterburner.

7. The plasma waste processing system of claim 5, wherein the plurality of waste processed is any type of carbonaceous material.

8. An integrated energy generation system, comprising:
a plasma waste processing system having an outlet for outputting gaseous emissions comprising at least a first component of sensible heat;
an existing coal fired power plant or an existing oil fired power plant system in communication with the plasma waste processing system, and having an inlet for gaseous emissions; and
an integrator configured to transport gaseous emissions from the afterburner of the plasma waste processing system to the inlet of the existing coal fired power plant or the existing oil fired power plant, wherein at least the first component of sensible heat reduces the amount of coal required by the existing coal fired power plant or the amount of oil required by the existing oil fired power plant; and
a control system in communication with the integrator enabled to control the amount of thermal energy contained in the gaseous emissions output from the afterburner and input into existing coal fired power plant or existing oil fired power plant, wherein the control system provides a control module having logic enabled to monitor the induction of the gaseous emissions output of the afterburner including at least the temperature of the gaseous emissions and control at least a volume of the gaseous emissions output from the afterburner and input into the combustion chamber.

9. The integrated energy generation system of claim 8, the inlet of the coal fired power plant or the oil fired power plant configured to deliver the gaseous emissions to a turbine of the coal fired power plant or the oil fired power plant.

10. An integrated energy generation system, comprising:
an existing coal fired power plant system or an existing oil fired power plant system having a combustion chamber;
a plasma waste processing system comprising at least a plasma reactor, an afterburner, and a boiler, wherein the plasma reactor outputs at least a first component of sensible heat and a second component of by-product fuel gases, and wherein the afterburner receives at least the first and second components of the plasma reactor and outputs thermal energy generated from the first and second components;
an integrator for combining the output of the afterburner with the combustion chamber of the existing coal fired power plant or the existing oil fired power plant, wherein at least the thermal energy generated from the first and second components reduces the amount of coal required by the existing coal fired power plant or the amount of oil required by the existing oil fired power plant; and
a control system in communication with the integrator enabled to control the amount of thermal energy output from the afterburner and input into the combustion chamber, wherein the control system provides a control module having logic enabled to monitor the induction of a plurality of gases from the output of the afterburner including at least the temperature of the gases and control at least a volume of the gases output from the afterburner and input into the combustion chamber.

11. The integrated energy generation system of claim 10, wherein a quantity of the coal or the oil combusted by the coal fired power plant or the oil fired power plant is reduced by an amount proportionate to the quantity of thermal energy generated from the afterburner.

12. The integrated system of claim 10, wherein the waste processed is any type of carbonaceous material.

13. A method of recovering the energy value of a waste stream comprising the steps of:
processing waste in a plasma waste processing system, the plasma waste processing system comprising at least a plasma reactor and an afterburner, wherein the plasma reactor outputs at least a first component of sensible heat and a second component of by-product fuel gases, and wherein the afterburner receives at least the first and second components of the plasma reactor and outputs thermal energy generated from the first and second components;
transmitting the thermal energy from the afterburner to a combustion chamber of an existing coal fired power plant or an existing oil fired power plant, wherein the thermal energy from the afterburner reduces the amount of coal required by the existing coal fired power plant or the amount of oil required by the existing oil fired power plant;
controlling the amount of thermal energy output from the afterburner and input into the combustion chamber with a control system, wherein the control system provides a control module having logic enabled to monitor the induction of a plurality of gases from the output of the afterburner including at least the temperature of the gases and control at least a volume of the gases output from the afterburner and input into the combustion chamber; and
converting a quantity of thermal energy produced by the combustion chamber into a quantity of electrical energy through the use of a generator of the existing coal fired power plant system or the existing oil fired power plant.

14. The method of recovering the energy value of a waste stream of claim 13, wherein the step of transmitting the thermal energy from the afterburner to a combustion chamber is carried out by an integrator .

* * * * *